US009945936B2

(12) United States Patent
Nevet

(10) Patent No.: US 9,945,936 B2
(45) Date of Patent: Apr. 17, 2018

(54) REDUCTION IN CAMERA TO CAMERA INTERFERENCE IN DEPTH MEASUREMENTS USING SPREAD SPECTRUM

(71) Applicant: Microsoft Technology Licensing, LLC, Redmond, WA (US)

(72) Inventor: Amir Nevet, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 334 days.

(21) Appl. No.: 14/722,838

(22) Filed: May 27, 2015

(65) Prior Publication Data

US 2016/0349359 A1    Dec. 1, 2016

(51) Int. Cl.
| | |
|---|---|
| *G01S 7/486* | (2006.01) |
| *G01S 7/48* | (2006.01) |
| *G01S 17/89* | (2006.01) |
| *G01S 17/87* | (2006.01) |
| *G01S 17/10* | (2006.01) |

(Continued)

(52) U.S. Cl.
CPC ............. *G01S 7/4865* (2013.01); *G01S 7/48* (2013.01); *G01S 17/107* (2013.01); *G01S 17/32* (2013.01); *G01S 17/87* (2013.01); *G01S 17/89* (2013.01); *G01S 17/36* (2013.01)

(58) Field of Classification Search
CPC .... G01S 7/4865; G01S 7/4866; G01S 7/4915; G01S 17/107; G01S 17/36; G06T 2207/10028
See application file for complete search history.

(56) References Cited

U.S. PATENT DOCUMENTS

| | | | |
|---|---|---|---|
| 5,164,823 A | 11/1992 | Keeler | |
| 6,522,395 B1 * | 2/2003 | Bamji | ...................... G01C 3/08 348/E3.018 |
| 7,405,812 B1 | 7/2008 | Bamji | |

(Continued)

FOREIGN PATENT DOCUMENTS

| | | |
|---|---|---|
| EP | 2594959 A1 | 5/2013 |
| WO | 2010076775 A2 | 7/2010 |

(Continued)

OTHER PUBLICATIONS

Buttgen et al.; "Pseudonoise Optical Modulation for Real-Time 3-D Imaging with Minimum Interference"; Oct. 2007; IEEE Transactions on Circuits and Systems I: Regular Papers; vol. 54; Issue: 10; pp. 2109-2119.*

(Continued)

*Primary Examiner* — John Villecco
(74) *Attorney, Agent, or Firm* — Mark K. Young; Mayer & Williams PC

(57) ABSTRACT

Reduction in interference between different time of flight (ToF) cameras used for depth measurements and operating in the same application environment is achieved using a spread spectrum technique in which the cyclical operations of a pulsed light source such as a laser or light emitting diode (LED) and gated image sensor are varied in a pseudo-random manner in each camera. In an alternative embodiment, spread spectrum logic is applied in a ToF camera that employs phase modulation techniques.

15 Claims, 8 Drawing Sheets

(51) Int. Cl.
*G01S 17/32* (2006.01)
*G01S 17/36* (2006.01)

(56) References Cited

U.S. PATENT DOCUMENTS

| | | | |
|---|---|---|---|
| 7,884,310 B2* | 2/2011 | Buettgen | H01L 27/14603 |
| | | | 250/208.1 |
| 8,194,126 B2* | 6/2012 | David | G01S 7/483 |
| | | | 348/139 |
| 9,599,712 B2* | 3/2017 | Van Der Tempel | G01S 17/10 |
| 2007/0058038 A1* | 3/2007 | David | G01S 7/483 |
| | | | 348/135 |
| 2010/0171813 A1 | 7/2010 | Pelman et al. | |
| 2011/0169998 A1 | 7/2011 | Canetti | |
| 2011/0299059 A1* | 12/2011 | Buettgen | G01S 7/4911 |
| | | | 356/5.01 |
| 2012/0098964 A1 | 4/2012 | Oggier et al. | |
| 2012/0154535 A1 | 6/2012 | Yahav et al. | |
| 2012/0194650 A1 | 8/2012 | Izadi et al. | |
| 2012/0287242 A1 | 11/2012 | Gilboa et al. | |
| 2012/0307230 A1* | 12/2012 | Dorrington | G01S 17/89 |
| | | | 356/5.1 |
| 2013/0208091 A1 | 8/2013 | Yahav et al. | |
| 2013/0235160 A1 | 9/2013 | Cohen et al. | |
| 2013/0242058 A1* | 9/2013 | Bae | H04N 13/0271 |
| | | | 348/47 |
| 2014/0152974 A1 | 6/2014 | Ko | |
| 2014/0160461 A1* | 6/2014 | Van Der Tempel | G01S 17/10 |
| | | | 356/5.01 |
| 2014/0313376 A1* | 10/2014 | Van Nieuwenhove | G01S 17/89 |
| | | | 348/241 |
| 2015/0296200 A1* | 10/2015 | Grauer | G01S 17/89 |
| | | | 348/49 |
| 2016/0061655 A1* | 3/2016 | Nozawa | G01S 17/10 |
| | | | 250/578.1 |
| 2016/0223656 A1* | 8/2016 | Hall | G01B 11/14 |
| 2017/0188019 A1* | 6/2017 | Kashyap | H04N 13/0296 |
| 2017/0227643 A1* | 8/2017 | Nagai | G01S 17/36 |
| 2017/0323429 A1* | 11/2017 | Godbaz | G06T 5/002 |

FOREIGN PATENT DOCUMENTS

| | | |
|---|---|---|
| WO | 2013104717 A1 | 7/2013 |
| WO | 2013127973 A1 | 9/2013 |

OTHER PUBLICATIONS

"Second Written Opinion Issued in PCT Application No. PCT/US2016/031692", dated May 2, 2017, (6 Pages total).

Kolb, et al., "Time-of-Flight Cameras in Computer Graphics", In Proceedings of Computer Graphics Forum, vol. 29, Issue 1, Mar. 2010, (18 pages total).

Fuchs, Stefan, "Multipath Interference Compensation in Time-of-Flight Camera Images", In Proceedings of 20th International Conference on Pattern Recognition, Aug. 23, 2010, pp. 3583-3586 (4 pages total).

Buttgen, et al., "Robust Optical Time-of-Flight Range Imaging Based on Smart Pixel Structures", In IEEE Transactions on Circuits and Systems I: Regular Papers, vol. 55, Issue 6, Jul. 2008, pp. 1512-1525 (14 pages total).

"International Search Report and Written Opinion Issued in PCT Application No. PCT/US2016/031692", dated Aug. 10, 2016, (14 Pages total).

"International Preliminary Report on Patentability Issued in PCT Application No. PCT/US2016/031692", dated Aug. 28, 2017, 8 Pages.

* cited by examiner

REDUCTION IN CAMERA TO CAMERA INTERFERENCE IN DEPTH MEASUREMENTS USING SPREAD SPECTRUM

BACKGROUND

The number and variety of applications for systems and devices that use depth sensing cameras are increasing. Accordingly, it is anticipated that multiple instances of depth cameras may be used within the same environment which can result in interference in depth camera operations.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Reduction in interference between different time of flight (ToF) cameras used for depth measurements and operating in the same application environment is achieved using a spread spectrum technique in which the cyclical operations of a pulsed light source such as a laser or light emitting diode (LED) and gated image sensor are varied in a pseudo-random manner in each camera. The light pulse emission from the source and collection of pulses reflected from the environment at the image sensor are convolved to enable depth measurement over a particular range of distances (i.e., over a particular "slice" of the application environment).

Amounts of light collected on the image sensor when its gate is open are used to determine distances to features of an imaged scene in three dimensions (3D). With the present spread spectrum techniques, the ToF cameras employ different emission and gate sequences having periods that are randomly distributed over multiple cycles. This results in light pulses from a first ToF camera arriving at an open gate of a second ToF camera with random time delays. Over many cycles of emission and gate operations, the random time delays at the second ToF camera become evenly distributed over the distance range so as to integrate into a signal that is unrelated to depth and to mimic the effect of ambient light. By varying the sequence of periods pseudo-randomly, the frequency of ToF camera operation is effectively broadened which reduces interference among cameras while also reducing EMI (electro-magnetic interference) noise levels. In an alternative embodiment, spread spectrum logic is applied in a ToF camera that employs phase modulation techniques.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
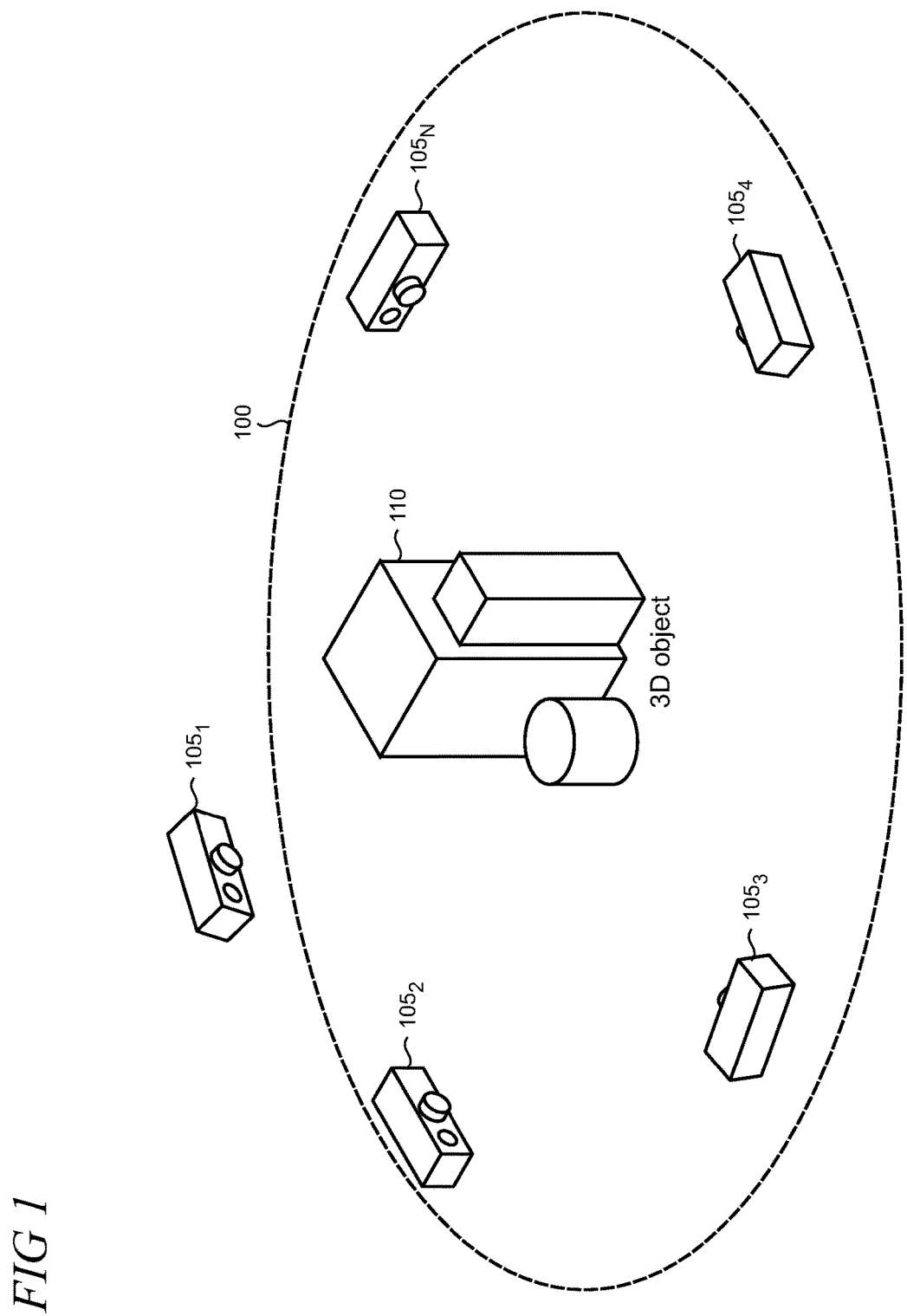
FIG. 1 shows an illustrative application environment in which multiple 3D time-of-flight (ToF) cameras are arranged to sense one or more three dimensional objects.

FIG. 1 shows an illustrative application environment 100 in which multiple cameras 105 using time of flight (ToF) principles are operated simultaneously to capture 3D depth data about the environment and objects therein including a representative object 110. The cameras 105 can be used in many different application environments including manufacturing using machine or robot vision, surveying, gaming, product design, collaborative experiences, applications using head tracking, gesture recognition, and other inputs, and other applications in which an environment and/or objects are imaged as a function of distance. Surfaces in the environment can be reconstructed with various appropriate surface reconstruction techniques using the 3D depth data in some applications. The cameras 105 can operate within a physical space that may comprise an indoor space and/or an outdoor space in some applications. Boundaries such as walls and ceilings, which can be part of the sensed environment, are not shown for sake of clarity.

Figure 2:
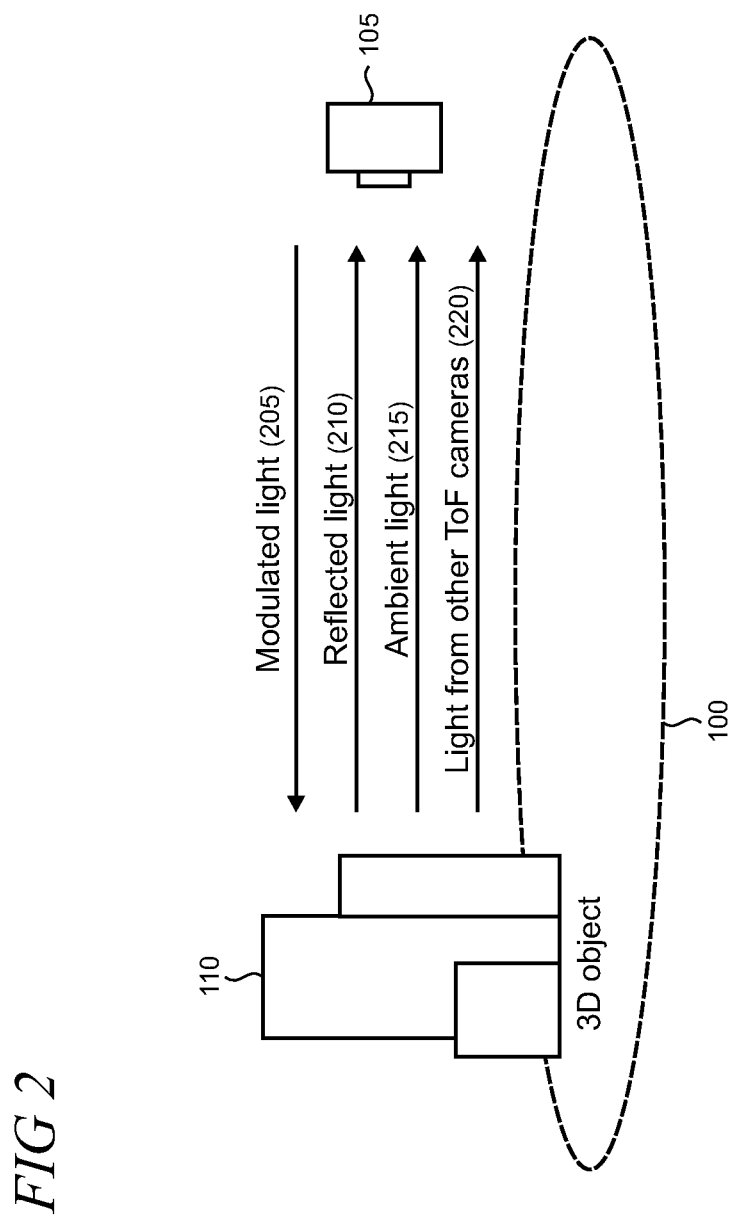
FIG. 2 shows different types of light that are present in the application environment.

As shown in FIG. 2, a given camera 105 can emit modulated light 205 which is sensed by an image sensor in the camera when received as reflected light 210 in order to determine depth. Ambient light 215 from the application environment 100 can also impinge the camera 105. Depending on positions and/or movement of the cameras 105 in the application environment 100, opportunities for potential interference arise when the cameras are imaging the same scene or when they are facing each other. Light (indicated by reference numeral 220) from other cameras can be detected by a camera 105 which can ordinarily lead to erroneous depth sensing. The present spread spectrum techniques enable the cameras 105 to simultaneously operate in the application environment with substantially reduced interference in many implementations.

Figure 3:
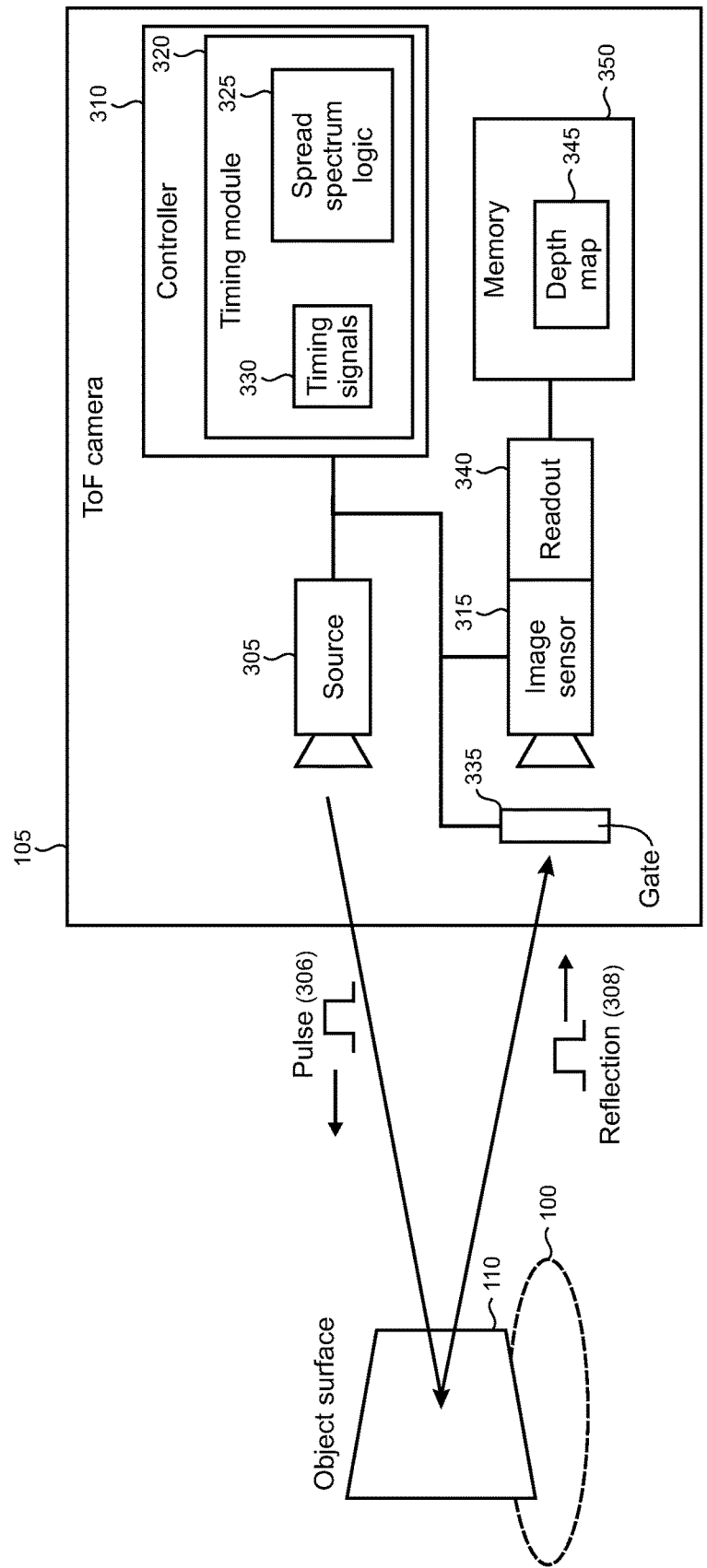
FIG. 3 shows a simplified functional block diagram of an illustrative ToF camera that employs spread spectrum.

FIG. 3 shows a simplified functional block diagram of components in an illustrative camera 105 that employs the present spread spectrum techniques. Optical components such as lenses and filters may be incorporated into the camera 105 in some implementations (not shown). A light source 305, which may comprise an array of edge emitting laser diodes for example, is controlled using a controller 310 to provide pulses of light 306 for illuminating a scene being imaged, and a gated image sensor 315 for imaging light from the reflected light pulses 308 that are from objects 110 in the environment 100. The controller 310 includes a timing module 320 that applies spread spectrum logic 325 when generating timing signals 330 that control operations of the camera components.

The gated image sensor 315 includes a sensing device having a photosensitive surface (referred to as a "photosurface"), such as a charge coupled device (CCD) or CMOS (complementary metal-oxide semiconductor) photosurface that includes an array of pixels and a gating mechanism for gating the image sensor open and closed, such as an optical shutter or a gated image intensifier. The gating mechanism is selectively controllable to have low or high transmittance and can be implemented using a discrete gate 335 or with a gate that is incorporated into the image sensor. The gate 335 is considered "closed" when it has low transmittance for light in its operating band and gates the image sensor off, and is said to be "open" when it has high transmittance for light in its operating band and gates the image sensor on. A "gate" refers to a period during which the image sensor is gated on by the gate 335 and the sensor receives light transmitted through the gate.

Distance accuracy in typical implementations of spread spectrum is dependent on a convolution of a spectrum of the light source 305 and a contrast ratio (CR) function of the gate. The CR function defines a dependency of contrast ratio of the gate on optical wavelength. For a given wavelength, CR is a ratio between a relatively high transparency of the gate at the wavelength when the shutter is open to a relatively low transparency of the gate for light at the wavelength when the gate is closed.

For given shapes (e.g., rise times, fall times, and widths) of light pulses and gates, the accuracy of distance measurements can be optimized by matching the gate CR function and light source spectrum to maximize the convolution of the CR function and spectrum. Generally, matching a light source spectrum to a shutter substantially centers the spectrum in the operating band of the gate (it is noted that the convolution between the gate CR and the light source spectrum may be referred to as contrast intensity (CI)).

The reflection 308 from an object surface in the environment 100 is registered on pixels of the image sensor photosurface only if it reaches the camera when it is gated open. The data from the image sensor may be read out (indicated by reference numeral 340) and utilized to generate a depth map 345 stored in a memory 350 component in the camera 105.

Figure 4:
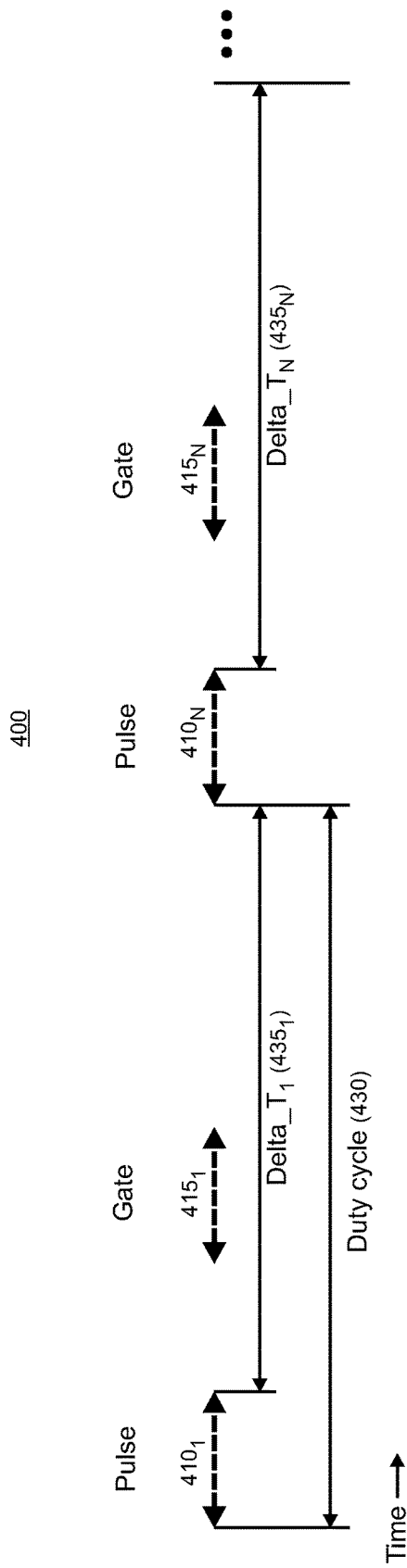
FIG. 4 shows an illustrative sequence of emission and collection that are cyclically performed.

FIG. 4 shows an illustrative sequence 400 of pulse emission and gate openings that is cyclically performed by the camera 105 (FIG. 3) (it is noted that the elements shown in FIG. 4 are not drawn to scale). The light source 305 may be controlled using the timing signals 330 to illuminate a scene in the environment 100 with a train of transmitted pulses of light. The pulses 410 are typically emitted in the infrared band to make them unobtrusive to human observers and device users at a wavelength that falls within the operating band of the gate 335. After each pulse, the gate 415 is opened to enable light to be collected on the image sensor. The sequence 400 is iterated over N cycles where N is generally greater than several hundred in typical implementations.

During each cycle of light pulse and gate operation, the source generates and dissipates heat in the camera and the light source temperature cycles between a minimum and maximum temperature. For effective thermal management the source is typically operated using a duty cycle that uses a time interval, Delta_T, between successive pulses. (The duty cycle and Delta_T are respectively indicated by reference numerals 430 and 435).

In some conventional cameras using time of flight, the period of the duty cycle is typically constant and Delta_T is selected primarily in view of thermal management considerations. The constant period generally means that cameras in a multi-camera environment could end up using exposures that overlap (i.e., have some degree of synchronization) causing erroneous distance data to be imaged.

By contrast, the present spread spectrum techniques employ a pseudo-random varying period so that the sequence 400 is cyclically performed with periods having random lengths bounded within some time interval associated with the range of depth being measured by the ToF camera. For example, a single 5 nsec pulse is sent and a single 10 nsec gate is opened 10 nsec after sending the pulse. The next pulse is sent Delta_T after the previous pulse, when Delta_T is pseudo-randomly chosen from the range [150 ns, 190 ns] in increments of 1 ns, for a distance range of up to 4.5 m.

Because two ToF cameras using spread spectrum will output different sequences, the pulses of one camera will arrive to the other camera in random time delays with respect to the camera's open gate. When these time delays are spread over many repetitions—for example, at least an order of magnitude of the number of possible time delays (e.g., 40 in the case of the 150 to 190 ns range), so that all the possible time delays are equally distributed—they essentially function as an integrated signal which is unrelated to the depth of the object measured in each pixel illuminated by the interfering camera.

Figure 5:
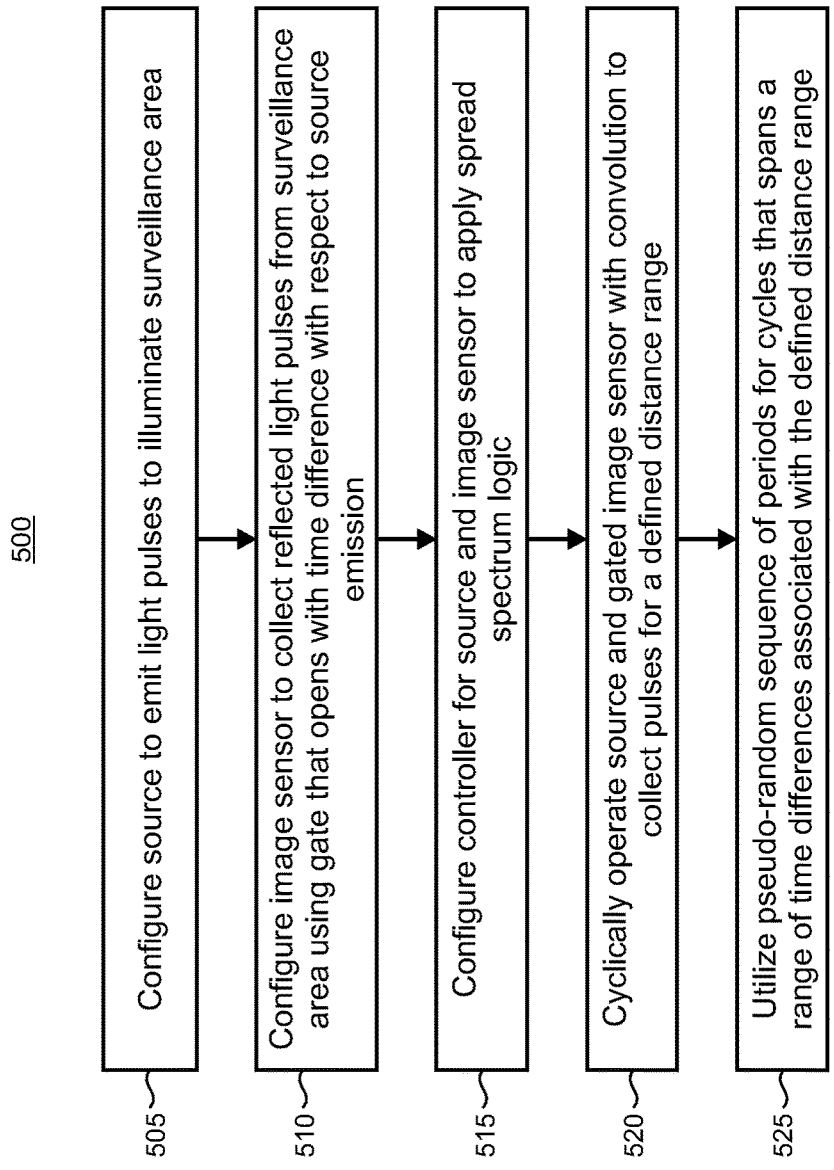
FIG. 5 is a flowchart of an illustrative method of operating a ToF camera using spread spectrum.

FIG. 5 is a flowchart of an illustrative method 500 for operating a ToF camera (such as camera 105 shown in FIG. 3) using the present spread spectrum techniques. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 505, a source is configured to emit light pulses to illuminate a surveillance area. The light pulses can have particular characteristics including width, wavelength, shape, etc. In step 510, an image sensor is configured to collect light pulses that are reflected from the surveillance area using a gate that is open with a time difference with respect to the source. The gate can also have particular characteristics including width, wavelength, shape, etc. In step 515, a controller for the source and the gated image sensor is configured to apply spread spectrum logic as the source and image sensor are operated.

In step 520, the source and the gated image sensor are operated in a cyclical manner with convolution of operating functions for the source and gate so that light pulses are collected and depth measurement is enabled over a defined range of distances. In step 525, a pseudo-random sequence of periods is utilized for the operating cycles that spans a range of time differences associated with the defined distance range. For example, a value for Delta_T (i.e., the time difference or delay between successive light pulse operations) is pseudo-randomly chosen over a range that corresponds with the range of distances being measured by the ToF camera. The cycle of generating a light pulse and opening the gate of the image sensor to collect reflected light is generally performed as a sequence having many iterations so that the pseudo-randomly selected delays are evenly distributed over the defined distance range.

Figure 6:
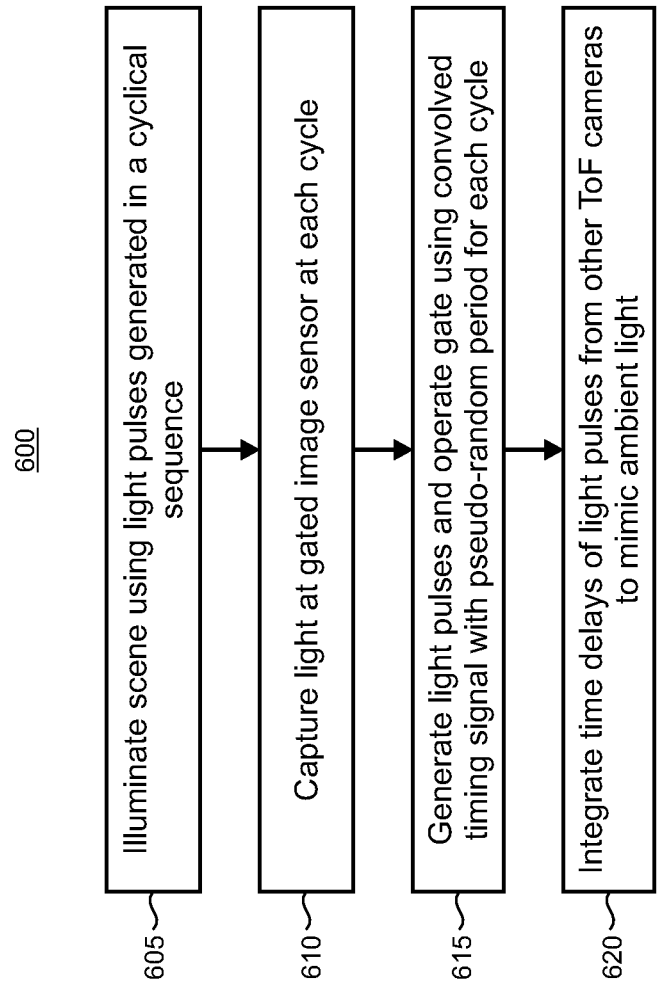
FIG. 6 is a flowchart of an illustrative method of operating a ToF camera using light pulse generation and gate operations that have a pseudo-random sequence of periods.

FIG. 6 is a flowchart of an illustrative method 600 for reducing interference among multiple instances of time of flight (ToF) cameras that are used to render a depth image of a scene. In step 605, the scene is illuminated using light pulses that are generated in a cyclical sequence. In step 610, for each cycle, light is captured at a gated image sensor. In step 615, the light pulses are generated and the gate is operated responsively to convolved timing signals so that depth is measured over a predetermined range of distances and using a sequence of light pulses that have a pseudo-randomly selected period for each cycle. In step 620, the time delays of light pulses from other ToF cameras are integrated so that the delays are evenly distributed over the predetermined range of distances to thereby mimic ambient light.

In an alternative implementation, instead of using a pulsed source, a continuous wave light source is modulated using multiple frequencies (to reduce aliasing and extend ToF camera sensing range using frequencies that each have a different ambiguity distance) which are subjected to spreading using a pseudo-random sequence that is commonly shared between a light source and a non-gated image sensor. The image sensor is synchronously operated with the light source in lock step to enable the original modulated signal to be reconstructed and a phase difference between the emitted and reflected light as determined by a phase detector component is utilized to determine depth. Light emitted from other spread spectrum ToF cameras (that use different spreading sequences as they are selected pseudo-randomly) will appear to have random phase when integrated at the image sensor and will thus mimic the effects of ambient light.

Figure 7:
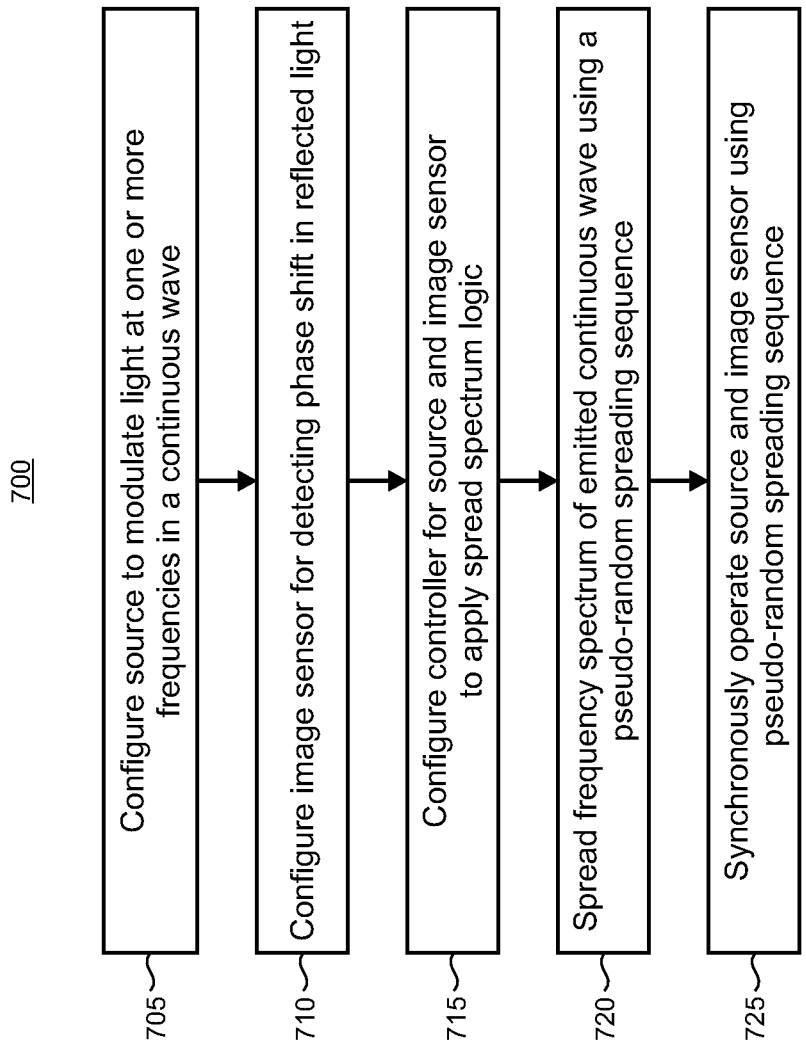
FIG. 7 is a flowchart of an illustrative method of operating a ToF camera using phase modulation.

FIG. 7 is a flowchart of an illustrative method 700 that may be performed by a ToF camera that employs phase modulation techniques that are described above. In step 705, a source is configured to modulate light at one or more frequencies in a continuous wave. In step 710, an image sensor is configured to detect phase shift in reflected light. In step 715, a controller for the source and image sensor is configured to apply spread spectrum logic as the source and image sensor are operated. In step 720, the frequency spectrum of the emitted continuous wave is spread using a pseudo-random spreading sequence. In step 725, the source and image sensor are operated in a synchronous manner using the pseudo-random spreading sequence so that phase differences can be detected to measure depth.

Figure 8:
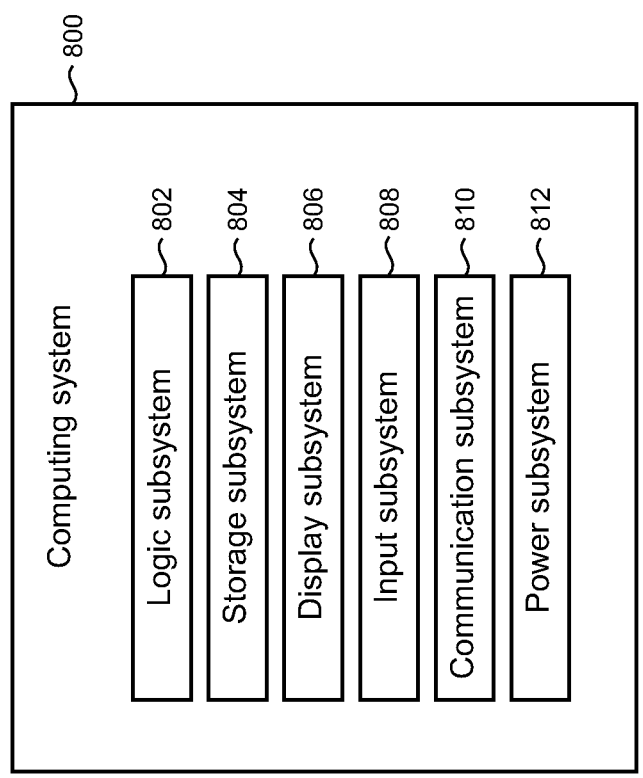
FIG. 8 shows a simplified block diagram of an illustrative computing system that utilizes a ToF camera that employs spread spectrum.

FIG. 8 schematically shows a non-limiting embodiment of a computing system 800 that can enact one or more of the methods and processes described above. Computing system 800 is shown in simplified form. It will be understood that virtually any computer architecture may be used without departing from the scope of this disclosure. In different embodiments, computing system 800 may take the form of a mainframe computer, server computer, desktop computer, laptop computer, tablet computer, home-entertainment computer, network computing device, gaming device, mobile computing device, mobile communication device (e.g., smart phone), wearable device, head mounted display (HMD) device, etc.

Computing system 800 includes a logic subsystem 802 and a storage subsystem 804. Computing system 800 may optionally include a display subsystem 806, an input subsystem 808, a communication subsystem 810, a power subsystem 812 (e.g., one or more batteries, charger, controller, etc.) and/or other components not shown in FIG. 8.

Logic subsystem 802 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem 802 may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel, or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 804 includes one or more physical, non-transitory, devices configured to hold data and/or instructions executable by the logic subsystem to implement the methods and processes described herein. When such methods and processes are implemented, the state of storage subsystem 804 may be transformed, for example, to hold different data.

Storage subsystem 804 may include removable media and/or built-in devices. Storage subsystem 804 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 804 may include volatile, nonvolatile, dynamic, static, read/write, read-only, random-access, sequential-access, location-addressable, file-addressable, and/or content-addressable devices.

It will be appreciated that storage subsystem 804 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

In some embodiments, aspects of logic subsystem 802 and of storage subsystem 804 may be integrated together into one or more hardware-logic components through which the functionality described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module," "program," and "engine" may be used to describe an aspect of computing system 800 implemented to perform a particular function. In some cases, a module, program, or engine may be instantiated via logic subsystem 802 executing instructions held by storage subsystem 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage subsystem 804. This visual representation may take the form of a graphical user interface (GUI). As the herein described methods and processes change the data held by the storage subsystem, and thus transform the state of the storage subsystem, the state of display subsystem 806 may likewise be transformed to visually represent changes in the underlying data. Display subsystem 806 may include one or more display devices utilizing virtually any type of technology. Such display devices may be combined with logic subsystem 802 and/or storage subsystem 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry (e.g., tracking system). Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision, surface reconstruction, gesture recognition, and the like; a head tracker, eye tracker, accelerometer, and/or gyroscope for motion detection and/or intent recognition; as well as electric-field sensing componentry for assessing brain activity.

In some embodiments, input subsystem 808 may comprise or interface with a "structured light" depth camera, which may be configured to project a structured infrared illumination comprising numerous, discrete features (e.g., lines or dots). A camera may be configured to image the structured illumination reflected from the scene. Based on the spacings between adjacent features in the various regions of the imaged scene, a depth map of the scene may be constructed.

Input subsystem 808 may comprise or interface with a ToF depth camera, which may include a light source configured to project a pulsed infrared illumination onto a scene. Two cameras may be configured to detect the pulsed illumination reflected from the scene. The cameras may include an electronic gate synchronized to the pulsed illumination, but the integration times for the cameras may differ, such that a pixel-resolved time-of-flight of the pulsed illumination, from the light source to the scene and then to the cameras, is discernible from the relative amounts of light received in corresponding pixels of the two cameras.

When included, communication subsystem 810 may be configured to communicatively couple computing system 800 with one or more other computing systems. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Various exemplary embodiments of the present reduction in camera to camera interference in depth measurements using spread spectrum are now presented by way of illustration and not as an exhaustive list of all embodiments. An example includes a time of flight (ToF) camera configured for optical depth sensing supporting reduced camera-to-camera interference in a multi-camera environment, comprising: a source configured for emitting light pulses to illuminate a surveillance area; an image sensor configured for collecting light pulses reflected from the surveillance area and including a gate that is operated with a time difference with respect to the emission from the source; and a controller operatively coupled to the light source and the gated image sensor, the controller including a timing module applying spread spectrum logic, the controller configured for cyclically operating the source to emit light pulses and the gated image sensor to collect light pulses, wherein the operating is convolved so that light pulses are collected for a defined range of distances between the ToF camera and the surveillance area, and utilizing a pseudo-random sequence of periods for the cyclical operation wherein the pseudo-random sequence of periods spans a range of time differences associated with the defined range of distances.

In another example, the cyclical operating of the source and gated image sensor is performed synchronously to generate a depth map of portions of the surveillance area corresponding to the defined range of distances. In another example, the ToF camera further includes a memory for storing the depth map. In another example, the ToF camera further includes reading out depth data from the gated image sensor. In another example, the ToF camera further includes pseudo-randomly varying the time difference between successive operations of light pulse generation using a predetermined number of time differences. In another example, the ToF camera further includes performing the cyclical operating using a count that exceeds the predetermined number of time differences by at least an order of magnitude. In another example, the ToF camera further includes optical components selected from one of lens or filter. In another example, the ToF camera further includes matching a contrast ratio function of the gate to a spectrum of the source so as to maximize the convolution. In another example, maximization of the convolution substantially centers the spectrum within an operating band of the gate. In another example, the defined distance range comprises a predetermined slice of the surveillance area.

A further example includes a method for reducing interference among multiple instances of time of flight (ToF) cameras used to render a depth image of a scene, comprising: illuminating the scene using light pulses from a source that are generated in a cyclical sequence; capturing light at a gated image sensor in a ToF camera in each cycle of the sequence, the image sensor having a plurality of light sensitive pixels each of which provides an output responsive to light captured thereon; and configuring a controller to operate the source to generate light pulses and operate a gate of the image sensor, the operating being responsive to convolved timing signals so that depth is measured over a predetermined range of distances, the timing signals causing the sequence of light pulses to have a pseudo-randomly selected period for each cycle.

In another example, the method further includes distributing pseudo-random time delays over the cyclical sequence by using a non-constant period for each cycle. In another example, the method further includes generating the light pulses with pseudo-random periods so that each ToF camera operates in an asynchronous manner with respect to other camera instances. In another example, the method further includes generating a period of variable length by pseudo-randomly varying a time delay between successive light pulses. In another example, the pseudo-randomly varying time delay exceeds a duty cycle length of a ToF camera. In another example, the method further includes integrating the time delays of light pulses received from other ToF cameras over multiple operating cycles so that the time delays are substantially evenly distributed across the predetermined range of distances to thereby mimic an effect of ambient light. In another example, the time delays received at an image sensor are integrated into a signal that is unrelated to depth.

A further example includes a time of flight (ToF) camera configured for optical depth sensing supporting reduced camera-to-camera interference in a multi-camera environment, comprising: a source configured for modulating light at one or more frequencies in a continuous wave to illuminate a surveillance area; an image sensor configured for receiving light reflected from the surveillance area, the image sensor including a phase detector for detecting phase shift in the reflected light, the detected phase shift being usable for measuring distances from reflecting surfaces in the surveillance area to the camera; a controller operatively coupled to the source and image sensor, the controller applying spread spectrum logic, the controller being configured for spreading a frequency spectrum of the emitted continuous wave light using a pseudo-random spreading sequence, and synchronously operating the image sensor with the source using the pseudo-random spreading sequence so that the modulated light from the source can be reconstructed at the image sensor.

In another example, the source is configured for emitting light in multiple continuous waves of different frequencies for de-aliasing. In another example, each of the different frequencies is associated with a different ambiguity distance.

The subject matter described above is provided by way of illustration only and may not be construed as limiting. Various modifications and changes may be made to the subject matter described herein without following the example embodiments and applications illustrated and described, and without departing from the true spirit and scope of the present invention, which is set forth in the following claims.

What is claimed:

1. A time of flight (ToF) camera configured for optical depth sensing supporting reduced camera-to-camera interference in a multi-camera environment, comprising:
    a source configured for emitting light pulses to illuminate a surveillance area;
    an image sensor configured for collecting light pulses reflected from the surveillance area and including a gate that is operated with a time difference with respect to the emission from the source; and
    a controller operatively coupled to the light source and the gated image sensor, the controller including a timing module applying spread spectrum logic, the controller configured for
        cyclically operating the source to emit light pulses and the gated image sensor to collect light pulses, wherein the operating is convolved so that light pulses are collected for a defined range of distances between the ToF camera and the surveillance area, and
        utilizing a pseudo-random sequence of periods for the cyclical operation wherein the pseudo-random sequence of periods spans a range of time differences associated with the defined range of distances.

2. The ToF camera of claim 1 in which the cyclical operating of the source and gated image sensor is performed synchronously to generate a depth map of portions of the surveillance area corresponding to the defined range of distances.

3. The ToF camera of claim 2 further including a memory for storing the depth map.

4. The ToF camera of claim 2 further including reading out depth data from the gated image sensor.

5. The ToF camera of claim 4 further including pseudo-randomly varying the time difference between successive operations of light pulse generation using a predetermined number of time differences.

6. The ToF camera of claim 5 further including performing the cyclical operating using a count that exceeds the predetermined number of time differences by at least an order of magnitude.

7. The ToF camera of claim 1 further including optical components selected from one of lens or filter.

8. The ToF camera of claim 1 further including matching a contrast ratio function of the gate to a spectrum of the source so as to maximize the convolution.

9. The ToF camera of claim 8 in which maximization of the convolution substantially centers the spectrum within an operating band of the gate.

10. The ToF camera of claim 1 in which the defined distance range comprises a predetermined slice of the surveillance area.

11. A method for reducing interference among multiple instances of time of flight (ToF) cameras used to render a depth image of a scene, comprising:
    illuminating the scene using light pulses from a source that are generated in a cyclical sequence;
    capturing light at a gated image sensor in a ToF camera in each cycle of the sequence, the image sensor having a plurality of light sensitive pixels each of which provides an output responsive to light captured thereon; and
    configuring a controller to operate the source to generate light pulses and operate a gate of the image sensor, the operating being responsive to convolved timing signals so that depth is measured over a predetermined range of distances, the timing signals causing the sequence of light pulses to have a pseudo-randomly selected period for each cycle; and
    generating a period of variable length by pseudo-randomly varying a time delay between successive light pulses, in which the pseudo-randomly varying time delay exceeds a duty cycle length of a ToF camera.

12. The method of claim 11 further including distributing the pseudo-random time delays over the cyclical sequence by using a non-constant period for each cycle.

13. The method of claim 11 further including generating the light pulses with the pseudo-random periods so that each ToF camera operates in an asynchronous manner with respect to other camera instances.

14. The method of claim 11 further including integrating the time delays of light pulses received from other ToF cameras over multiple operating cycles so that the time delays are substantially evenly distributed across the predetermined range of distances to thereby mimic an effect of ambient light.

15. The method of claim 11 in which the time delays received at an image sensor are integrated into a signal that is unrelated to depth.

\* \* \* \* \*